(12) United States Patent
Shang

(10) Patent No.: US 9,897,427 B2
(45) Date of Patent: Feb. 20, 2018

(54) EDUCATIONAL RULER

(71) Applicants: Haoyu Xing, Shenzhen (CN); Zhi Shang, Shenzhen (CN)

(72) Inventor: Zhi Shang, Shenzhen (CN)

(73) Assignees: Haoyu Xing, Shenzhen (CN); Zhi Shang, Shenzhen (CN)

( * ) Notice: Subject to any disclaimer, the term of this patent is extended or adjusted under 35 U.S.C. 154(b) by 186 days.

(21) Appl. No.: 14/775,697

(22) PCT Filed: Nov. 12, 2013

(86) PCT No.: PCT/CN2013/086947
§ 371 (c)(1),
(2) Date: Sep. 13, 2015

(87) PCT Pub. No.: WO2015/066932
PCT Pub. Date: May 14, 2015

(65) Prior Publication Data
US 2016/0025476 A1    Jan. 28, 2016

(30) Foreign Application Priority Data
Nov. 8, 2013 (CN) .......................... 2013 1 0554738

(51) Int. Cl.
*G01B 3/56* (2006.01)
*G09B 23/04* (2006.01)
(Continued)

(52) U.S. Cl.
CPC .............. *G01B 3/563* (2013.01); *B43L 7/005* (2013.01); *B43L 7/027* (2013.01); *B43L 7/10* (2013.01);
(Continued)

(58) Field of Classification Search
CPC ......... G01B 3/563; G09B 23/04; B43L 7/005; B43L 7/027; B43L 9/002; B43L 9/005; B43L 13/002; B43L 13/205; B43L 7/10
(Continued)

(56) References Cited

U.S. PATENT DOCUMENTS 1,002,734 A * 9/1911 Morse .................. B43L 7/0275
                                                    33/474
1,500,427 A * 7/1924 Valkenburgh .......... G01B 3/563
                                                    33/471
(Continued)

FOREIGN PATENT DOCUMENTS

CN        2250514 Y      3/1997
CN        2296276 Y      11/1998
(Continued)

OTHER PUBLICATIONS

Ke Jingjie, the International Searching Authority written comments, dated Aug. 2014, CN.

*Primary Examiner* — R. A. Smith
*Assistant Examiner* — Tania Courson

(57) ABSTRACT

An educational ruler is a protractor, where the protractor can draw and measure angles. The educational ruler includes a planar disk having a semicircular circumference and labeled in scales along the semicircular circumference; a straight line edge connecting two edges of the semicircular circumference; a through hole on the planar disk; a first edge and a second edge extending from the through hole to the straight line edge; a third edge and a fourth edge extending from the semicircular circumference to the straight line edge. The first edge of the through hole of the educational ruler and the second edge of the through hole of the educational ruler intersect at 90 degrees scale of the planar disk to form the first right angle, and the included angle of
(Continued)

the first edge of the through hole of the educational ruler and the straight line edge of the educational ruler is 45 degrees.

8 Claims, 1 Drawing Sheet

(51) Int. Cl.
| | |
|---|---|
| *B43L 7/00* | (2006.01) |
| *B43L 9/00* | (2006.01) |
| *B43L 13/00* | (2006.01) |
| *B43L 13/20* | (2006.01) |
| *B43L 7/10* | (2006.01) |
| *B43L 7/027* | (2006.01) |

(52) U.S. Cl.
CPC ............... *B43L 9/002* (2013.01); *B43L 9/005* (2013.01); *B43L 13/002* (2013.01); *B43L 13/205* (2013.01); *G09B 23/04* (2013.01)

(58) Field of Classification Search
USPC .................. 33/27.01, 27.032, 403, 452, 465, 33/471–473, 482–484; 434/211–216
See application file for complete search history.

(56) References Cited

U.S. PATENT DOCUMENTS

| | | | | |
|---|---|---|---|---|
| 1,633,903 | A * | 6/1927 | Perrin | B43L 7/005 33/470 |
| 1,803,200 | A * | 4/1931 | Moore | B43L 7/005 33/484 |
| 1,896,432 | A * | 2/1933 | Van Winkle | G01B 3/56 33/1 N |
| 2,009,887 | A * | 7/1935 | Heyerdahl | G01B 3/563 33/471 |
| 2,557,965 | A * | 6/1951 | Hilsenrath | G01C 21/02 235/61 B |
| 2,952,074 | A * | 9/1960 | Gringorten | G06G 1/14 33/1 B |
| 3,109,239 | A * | 11/1963 | Wicker | G03F 5/22 101/211 |
| 3,340,624 | A * | 9/1967 | Savin | G09B 23/04 33/430 |
| 4,490,921 | A * | 1/1985 | Woods | B43L 7/005 33/1 N |
| 4,608,761 | A * | 9/1986 | Small | B23Q 9/0092 30/376 |
| 4,926,564 | A * | 5/1990 | Loggins | B43L 7/0275 33/474 |
| 4,969,271 | A * | 11/1990 | Sump | G01B 3/563 33/1 SD |
| 4,976,046 | A * | 12/1990 | Lee | B23Q 17/2216 33/202 |
| 5,031,333 | A * | 7/1991 | Shelley | B43L 13/201 33/562 |
| 5,113,590 | A * | 5/1992 | Shapiro | B43L 7/10 116/320 |
| 5,125,161 | A * | 6/1992 | Guthrie | B43L 9/002 33/27.01 |
| 5,819,426 | A * | 10/1998 | Virtanen | G01C 21/203 33/1 G |
| 5,864,959 | A * | 2/1999 | Johansen | B43L 7/007 33/1 N |
| 5,983,509 | A * | 11/1999 | Gosselin | G01C 21/20 33/1 SD |
| 7,383,635 | B1 * | 6/2008 | Stoneberg | B43L 7/005 33/27.03 |
| 2008/0078092 | A1 | 4/2008 | Lin | |
| 2012/0079729 | A1 * | 4/2012 | Al-Mutairi | B43L 7/005 33/27.02 |
| 2015/0033568 | A1 * | 2/2015 | Lin | B43L 7/0275 33/340 |
| 2017/0153101 | A1 * | 6/2017 | Ostachowski | B43L 7/10 |

FOREIGN PATENT DOCUMENTS

| | | |
|---|---|---|
| CN | 201257856 Y | 6/2009 |
| CN | 201272147 Y | 7/2009 |
| CN | 201275958 Y | 7/2009 |
| CN | 201449229 U | 5/2010 |
| CN | 201456788 U | 5/2010 |
| CN | 201998693 U | 10/2011 |
| CN | 202428933 U | 9/2012 |
| CN | 102896949 A | 1/2013 |
| CN | 203739488 U | 7/2014 |
| DE | 29808571 U | 1/1999 |

* cited by examiner

EDUCATIONAL RULER

TECHNICAL HELD

The present disclosure relates to the field of educational tools, and more particularly to an educational ruler.

BACKGROUND

When teaching, a teacher usually writes using chalk and draws using an instrument on a blackboard. The instrument includes a ruler, a set square, and a protractor, and so on. The protractor is a semi-circular structure, where an edge of the protractor is labeled with scales for measurement, and to draw an arc, a circle, and a straight line. The set square is an isosceles right triangle, or a 30-60-90 degree triangle, which can help in drawing an isosceles right triangle, a 30 degrees right triangle, a 60 degrees right triangle, and a straight line. Each of educational rulers has different functions, therefore, the teacher usually needs to carry different rulers when teaching, and change the educational ruler when drawing different pictures, which makes it inconvenient to carry and use.

SUMMARY

The aim of the present disclosure is to provide an educational ruler capable of being convenient to carry and use.

The aim of the present disclosure is achieved by the following methods:

An educational ruler of the present disclosure is a protractor as whole, comprises a planar disk having a semicircular circumference and labeled in scales along the semicircular circumference; a straight line edge connecting two edges of the semicircular circumference; a through hole on the planner disk; a first edge and a second edge extending from the through hole to the straight line edge; a third edge and a fourth edge extending from the semicircular circumference to the straight line edge, where the first edge of the through hole and the second edge of the through hole intersect at 90 degrees of the planar disk to form a first right angle, and an included angle of the first edge of the through hole and the straight line edge of the educational ruler is 45 degrees. The third edge of the through hole and the fourth edge of the through hole intersect at 60 degrees scale or 120 degrees scale of the planar disk to form a second right angle, and an included angle of the third edge of the through hole and the straight line edge of the educational ruler is 60 degrees.

Furthermore, an extension line of the second edge of the educational ruler and an extension line of the fourth edge of the educational ruler intersect, which is convenient to directly draw two right-angle edges of a 45 degrees right triangle, a 30 degrees right triangle, a 60 degrees right triangle and to draw a hypotenuse.

Furthermore, an intersection point of the extension line of the second edge of the educational ruler and the extension line of the fourth edge of the educational ruler, and the through hole form a first through hole and a second through hole, where the first through hole and the second through hole are triangular structures, which enhances strength of the educational ruler.

Furthermore, a first acute angle of the first through hole and a second acute angle of the second through hole are located on two ends of the straight line edge, respectively, which makes two right-angle edges of the two right-angles to be maximum and draws maximum triangles, and makes the educational ruler convenient to use.

Furthermore, a third acute angle of the first through hole and a fourth acute angle of the second through hole are arc-shaped structures, which increases area of the intersection point and enhances firmness of the educational ruler.

Furthermore, the straight line edge is labeled with scales, and the educational ruler can be regarded as a straight ruler.

Furthermore, the educational further comprises a strip-shaped through hole, a fixed hole arranged on an end of the strip-shaped through hole, and a fixed sliding block fixed on the strip-shaped through hole, wherein the fixed sliding block fixes the placing hole using a writing instrument placed on a placing hole of the fixed sliding block; the fixed sliding block slides along a side wall of the strip-shaped through hole. Thus, the fixed sliding block is adjusted accordingly to draw different circles.

Furthermore, two sides of the strip-shaped through hole are relative serrations, which limit and fix the fixed sliding block 7.

Furthermore, the fixed hole is a circular structure, thus, a circle-shaped stuff (eg. chalk) is inserted in the fixed hole, which improves fixed effect.

Furthermore, the educational ruler is transparent, which is convenient to watch what needs to be amended and to draw.

The present disclosure uses the educational ruler is the protractor, where the protractor can draw and measure angles. The first edge of the through hole of the educational ruler and a second edge of the through hole of the educational ruler intersect at 90 degrees scale of the protractor to form the first right angle, and the included angle of the first edge of the through hole of the educational ruler and the straight line edge of the educational ruler of the educational ruler is 45 degrees. The first edge, the second edge, and the straight line edge of the through hole of the educational ruler are outlined using a chalk to form an isosceles right triangle. The third edge 3 of the through hole of the educational ruler and the fourth edge of the through hole of the educational ruler intersect at 60 degrees scale or 120 degrees scale of the protractor to form the second right angle, and the included angle of the third edge of the through hole of the educational ruler and the straight line edge 6 of the educational ruler is 60 degrees. The third edge, the fourth edge, and the straight line edge of the through hole of the educational ruler can be outlined using a chalk to form a right triangle. Therefore, the educational ruler is also regarded as a set square, which makes it convenient to carry and use. It should be understand that the educational ruler can be made small, which makes it convenient to use by students and teachers.

Legends: 1. a first edge; 2. a second edge; 3. a third edge; 4. a fourth edge; 5. an arc edge; 6. a straight line edge; 7. a fixed sliding block; 8. an intersection point; 9. a fixed hole; 10. a first through hole; 11. a second through hole; 12. a strip-shaped through hole; 100. an educational ruler; 110. a planar disk; 120. a through hole.

DETAILED DESCRIPTION

The present disclosure will further be described in detail in accordance with the figures and the exemplary examples.

Figure 1:
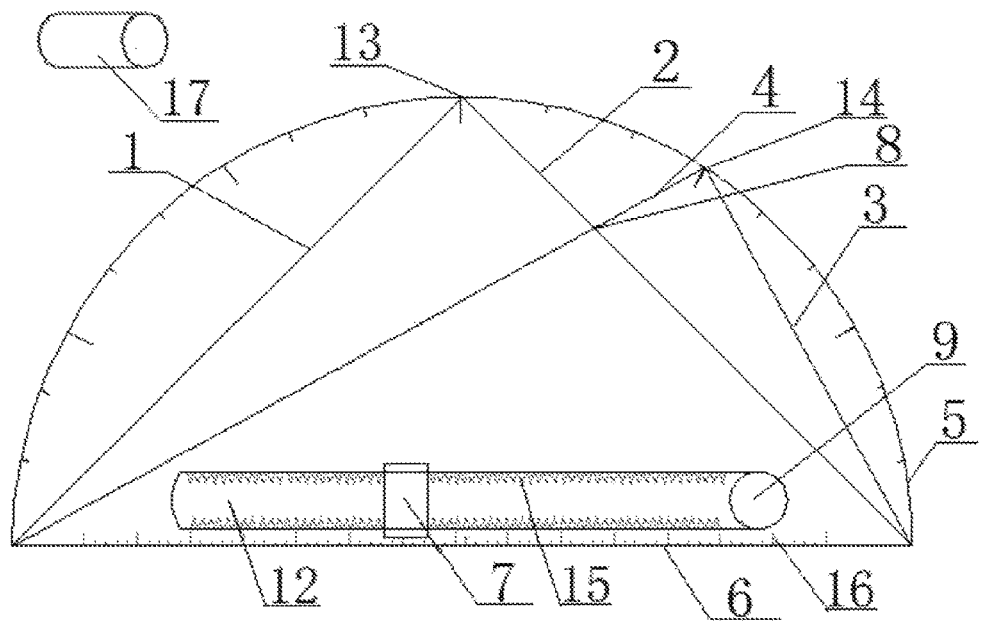
FIG. 1 is a structural diagram of an educational ruler of an example of the present disclosure.
Figure 2:
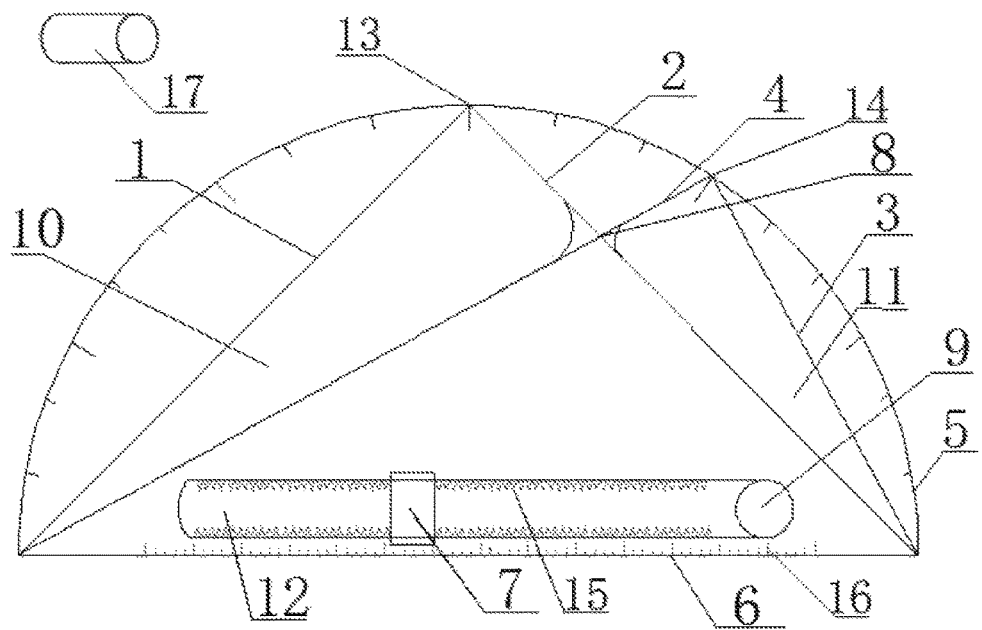
FIG. 2 is another structural diagram of the educational ruler of the example of the present disclosure.

As shown in the FIG. 1 and FIG. 2, an educational ruler 100 of the present disclosure is a protractor and comprises a planar disk 110 having a semicircular circumference and labeled in scales along the semicircular circumference; a straight line edge 6 connecting two edges of the semicircular circumference; a through hole 120 on the planar disk 110; a first edge 1 and a second edge 1 extending from the through hole 120 to the straight line edge 6; a third edge 3 and a fourth edge 4 extending from the semicircular circumference to the straight line edge 6, where the first edge 1 of the through hole 120 and the second edge 2 of the through hole 120 intersect at 90 degrees scale 13 of the planar disk to form a first right angle, and an included angle of the first edge 1 of the through hole 120 and the straight line edge 6 of the educational ruler is 45 degrees. The third edge 3 of the through hole 120 and the fourth edge 4 of the through hole intersect at 60 degrees scale or 120 degrees scale 14 of the planar disk to form a second right angle, and an included angle of the third edge 3 of the through hole 120 and the straight line edge 6 of the educational ruler is 60 degrees. The present disclosure uses the educational ruler as a protractor, where the protractor can draw and measure angles. The first edge 1 of the through hole of the educational ruler and a second edge 2 of the through hole of the educational ruler intersect at 90 degrees scale 13 of the protractor to form the first right angle, and the included angle of the first edge 1 of the through hole of the educational ruler and the straight line edge 6 of the educational ruler is 45 degrees. The first edge 1, the second edge 2, and the straight line edge 6 of the through hole of the educational ruler can be outline using a chalk 17 to form an isosceles right triangle. The third edge 3 of the through hole of the educational ruler and the fourth edge 4 of the through hole of the educational ruler intersect at 60 degrees scale or 120 degrees scale 14 of the protractor to form the second right angle, and the included angle of the third edge 3 of the through hole of the educational ruler and the straight line edge 6 of the educational ruler is 60 degrees. The third edge 3, the fourth edge 4, and the straight line edge 6 of the through hole of the educational ruler can be outline using chalk 17 to form a right triangle. Therefore, the educational ruler is also regarded as a set square, which makes it convenient to carry and use. It should be understand that the educational ruler can be made small, which makes it convenient to use by students and teachers.

In the example, a surface of a side of an arc edge 5 of the educational ruler is labeled with scales 16, which is convenient to draw a circle and measure angles.

As shown on the FIG. 1, an extension line of the second edge 2 of the educational ruler and an extension line of the fourth edge 4 of the educational ruler intersect at an intersection point 8, which makes it convenient to directly draw two right-angle edges of a 45 degrees right triangle, a 30 degrees right triangle, a 60 degrees right triangle, and to draw a hypotenuse.

As shown on the FIG. 1, the straight line edge 6 is labeled with scales, and the educational ruler can be regarded as a straight ruler, which is convenient to carry to use. The scale of the straight line edge 6 and the scale of the arc edge 5 are on a same surface of the educational ruler.

The FIG. 2 is improved according to FIG. 1 of the example: an extension line of the second edge 2 of the educational ruler and an extension line of the fourth edge 4 of the educational ruler intersect at the intersection point 8, which makes the through hole form a first through hole 10 and a second through hole 11. The first through hole 10 and the second through hole 11 are triangular structures, which enhances strength of the educational ruler. A first acute angle of the first through hole 10 and a second acute angle of the second through hole 11 are located on two ends of the straight line edge 6, respectively, which makes two right-angle edges of the two right-angles to be at a maximum, which can be used to draw maximum triangles, and makes the educational ruler convenient to use. A third acute angle of the first through hole 10 and a fourth acute angle of the second through hole 11 are arc-shaped structures, namely the two relative acute angles of the first through hole 10 and the second through hole 11 at the intersection 8 point are arc-shaped structures, which increases area of the intersection point 8 and enhances firmness of the educational ruler. The arc-shaped structure has no corner angles, which is convenient to carry. It should be understood that the first right angle, the second right angle, the first acute angle, and the second acute angle are also arc-shaped structures, which also enhances firmness of the educational ruler and makes educational ruler convenient to carry.

As shown on the FIG. 1 and FIG. 2, the educational ruler further comprises a strip-shaped through hole 12, a fixed hole 9 arranged on an end of the strip-shaped through hole 12, and a fixed sliding block 7 fixed on the strip-shaped through hole 12, where a width of the strip-shaped through hole 12 is greater than a diameter of the chalk, the chalk is placed on a placing hole, and the fixed sliding block 7 is used to fix the placing hole. The fixed sliding block 7 slides on a side wall of the strip-shaped through hole 12, according to a position of the fixed sliding block 7 on the side wall of the strip-shaped through hole 12, and an instrument (such as chalk, or pen) is inserted in the fixed hole 9 and is regarded as a center of a circle. Thus, the chalk is inserted in the placing hole of the fixed sliding block 7 to draw the circle. The fixed hole is a circular structure, which is convenient to be inserted and matched by the chalk or pen and draws the circle, further decreasing resistance. In the example, the fixed hole 9 is arranged on a right end of the fixed sliding block 7. It should be understood that the fixed hole 9 is arranged on a left end of the fixed sliding block 7.

In the example, two sides of the strip-shaped through hole 12 are relative serrations 15, which limit and fix the fixed sliding block 7, where the serrations 15 of two sides of the strip-shaped through hole 12 are completely symmetric. The serration is a comb-shaped serration.

In the example, the educational ruler can be made of plastic material and be transparent, which is convenient to watch what needs to be amended and to draw. It should be understood that other transparent materials can also be used.

The present disclosure is described in detail in accordance with the above contents with the specific exemplary examples. However, this present disclosure is not limited to the specific examples. For the ordinary technical personnel of the technical field of the present disclosure, on the premise of keeping the conception of, the technical personnel can also make simple deductions or replacements, and all of which should be considered to belong to the protection scope of the present disclosure.

I claim:
1. An educational ruler, comprising:
   a planar disk having a semicircular circumference and labeled in scales along the semicircular circumference;
   a straight line edge connecting two edges of the semicircular circumference;
   a through hole on the planar disk;

a first edge and a second edge extending from the through hole to the straight line edge; a third edge and a fourth edge extending from the semicircular circumference to the straight line edge;

wherein the first edge of the through hole and the second edge of the through hole intersect at 90 degrees scale of the planar disk to form a first right angle, and an included angle of the first edge of the through hole and the straight line edge of the educational ruler is 45 degrees; the third edge of the through hole and the fourth edge of the through hole intersect at 60 degrees scale or 120 degrees scale of the planar disk to form a second right angle, and an included angle of the third edge of the through hole and the straight line edge of the educational ruler is 60 degrees; an extension line of the second edge of the educational ruler and an extension line of the fourth edge of the educational ruler intersect; an intersection point of the extension line of the second edge of the educational ruler and the extension line of the fourth edge of the educational ruler, and the through hole form a first through hole and a second through hole; wherein the first through hole and the second through hole are triangular structures;

wherein a first acute angle of the first through hole and a second acute angle of the second through hole are located on two ends of the straight line edge, respectively;

wherein a third acute angle of the first through hole and a fourth acute angle of the second through hole are arc-shaped structures.

2. The educational ruler of claim 1, wherein the straight line edge is labeled with scales.

3. The educational ruler of claim 1, further comprising a strip-shaped through hole, a fixed placing hole arranged on an end of the strip-shaped through hole, and a fixed sliding block fixed on the strip-shaped through hole, wherein the fixed sliding block fixes the fixed placing hole using a chalk placed on the fixed placing hole of the fixed sliding block; the fixed sliding block slides along a side wall of the strip-shaped through hole.

4. The educational ruler of claim 3, wherein two sides of the strip-shaped through hole are relative serrations.

5. The educational ruler of claim 3, wherein the fixed hole is circular hole.

6. The educational ruler of claim 1, wherein the educational ruler is transparent.

7. The educational ruler of claim 1, wherein the straight line edge is labeled with scales.

8. A protractor, comprising:
a planar disk having a semicircular circumference and labeled in scales along the semicircular circumference;
a straight line edge connecting two edges of the semicircular circumference;
a through hole on the planar disk;
a first edge and a second edge extending from the through hole to the straight line edge; a third edge and a fourth edge extending from the semicircular circumference to the straight line edge;

wherein the first edge of the through hole and the second edge of the through hole intersect at 90 degrees scale of a side of the planar disk to form a first right angle, and an included angle of the first edge of the through hole and the straight line edge of the educational ruler is 45 degrees; the third edge of the through hole and the fourth edge of the through hole intersect at 60 degrees scale or 120 degrees scale of the planar disk to form a second right angle, and an included angle of the third edge of the through hole and the straight line edge of the educational ruler is 60 degrees; an extension line of the second edge of the educational ruler and an extension line of the fourth edge of the educational ruler intersect; an intersection point of the extension line of the second edge of the educational ruler and the extension line of the fourth edge of the educational ruler, and the through hole form a first through hole and a second through hole; wherein the first through hole and the second through hole are triangular structures;

wherein a first acute angle of the first through hole and a second acute angle of the second through hole are located on two ends of the straight line edge, respectively;

wherein a third acute angle of the first through hole and a fourth acute angle of the second through hole are arc-shaped structures.

* * * * *